US006792577B1

(12) United States Patent
Kimoto

(10) Patent No.: US 6,792,577 B1
(45) Date of Patent: Sep. 14, 2004

(54) DATA DISTRIBUTION METHOD AND APPARATUS, AND DATA RECEIVING METHOD AND APPARATUS

(75) Inventor: Yosuke Kimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 09/597,944

(22) Filed: Jun. 20, 2000

(30) Foreign Application Priority Data

Jun. 21, 1999 (JP) ............................................ 11-174721

(51) Int. Cl.[7] .......................... G06F 15/00; G06F 17/00; G06F 17/21; G06F 17/24
(52) U.S. Cl. ...................... 715/522; 715/513; 715/523; 705/50; 705/67; 705/71; 380/255; 380/258
(58) Field of Search .................. 715/513, 501.1, 715/500, 514, 523, 522, 526; 707/102, 1, 3, 10, 200; 705/26, 50, 67, 71; 380/255, 258; 709/203

(56) References Cited

U.S. PATENT DOCUMENTS

| 5,860,073 | A | * | 1/1999 | Ferrel et al. ................. 715/522 |
| 6,138,119 | A | * | 10/2000 | Hall et al. ...................... 707/9 |
| 6,199,082 | B1 | * | 3/2001 | Ferrel et al. ................. 715/522 |
| 6,356,903 | B1 | * | 3/2002 | Baxter et al. ................. 707/10 |
| 6,421,673 | B1 | * | 7/2002 | Caldwell et al. .............. 707/10 |
| 6,463,440 | B1 | * | 10/2002 | Hind et al. ................... 707/102 |
| 6,574,609 | B1 | * | 6/2003 | Downs et al. ................ 705/50 |
| 6,585,778 | B1 | * | 7/2003 | Hind et al. ................... 715/513 |

OTHER PUBLICATIONS

Dridi et al.: "Towards Access Control for Logical Document Structures" Proceedings of the Ninth International Workshop on Database and Expert Systems Applications, Aug. 26–28, 1998, pp. 322–327, XP010296609 Vienna, AT.

\* cited by examiner

*Primary Examiner*—Joseph Feild
*Assistant Examiner*—Paul Nguyen
(74) *Attorney, Agent, or Firm*—Frommer Lawrence & Haug LLP; William S. Frommer; Darren A. Simon

(57) ABSTRACT

Style sheets which define the expression form, etc., of documents in a meta-language (for example, XML) format in which tags which can be defined arbitrarily are used are managed appropriately. A style sheet is given a unique style ID. Since a receiving system is capable of storing style sheets separately from XML documents and managing them, it is unnecessary to add a style sheet to each XML document body and to transmit it, and thus the amount of the data to be transmitted can be reduced. Also, it is possible to protect the style sheets from unauthorized use by attaching key data to the XML document body, so that the style sheets can be managed as authored works. Furthermore, by specifying the other party or by providing a device for performing authentication, limited use of the style sheet becomes possible.

24 Claims, 17 Drawing Sheets

FIG. 8

```
<?XML version="1.0"?>

<CONTENTS name="NAME OF CONTENTS"
    author="AUTHOR OF CONTENTS"
    publisher="PUBLISHER OF CONTENTS"
    date="DATE ON WHICH CONTENTS WERE ISSUED"
    ID="ID OF CONTENTS" />

<STYLESWITCH defaultStyleSheetID="ID OF STYLE SHEET SELECTED BY DEFAULT">
    <USESTYLE styleSheetID="ID OF STYLE SHEET TO BE USED"
        rightKEY="KEY FOR WHICH USING RIGHT IS GRANTED" />
</STYLESWITCH>

......  DOCUMENT BODY  ......
```

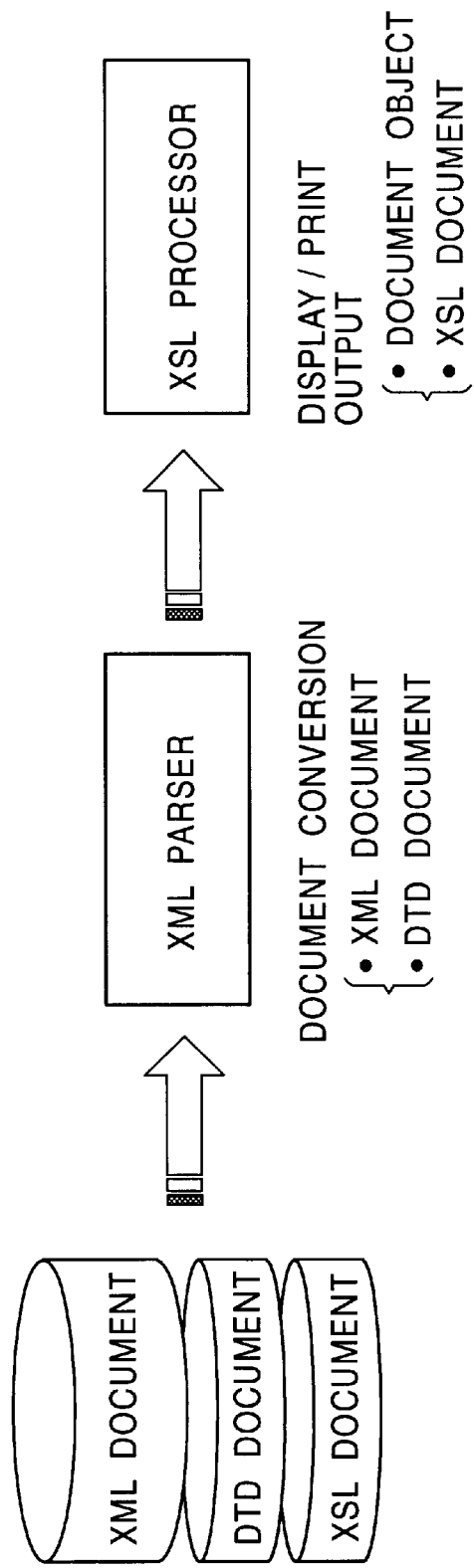

DATA DISTRIBUTION METHOD AND APPARATUS, AND DATA RECEIVING METHOD AND APPARATUS

BACKGROUND OF THE INVENTION

1. Field of the Invention

The present invention relates to digital data distribution technology, such as digital satellite broadcasts and multimedia content communication, and in particular, relates to a technology for distributing digital data composed of computer language instructions having data attributes. Digital data composed of instructions of a computer language having data attributes is described, for example, by a markup language format composed of tag data delimited by tags which define data attributes.

More particularly, the present invention relates to a technology for distributing digital data in a markup language (for example, XML (eXtensible Markup Language)) format in which tags can be defined arbitrarily are used and in particular, relates to handling of style sheets (for example, XSL (eXtensible Stylesheet Language)) documents for defining the expression form, etc., of distribution data composed of XML documents, etc.

2. Description of the Related Art

In the technical field of satellite television broadcasts, digitization of data is progressing rapidly. This is because use of digital data allows a broadcast band to be used more efficiently than does use of analog data and digital data has a greater compatibility with data other than video and audio data.

For example, in the case of digital data, it is possible to carry data for four data streams in one channel, and data for high-definition television can be transmitted as it is. Also, by sending various types of system information, such as an EPG (Electronic Program Guide) together with video information and audio information, services for users (viewers) can be improved.

Data in digital form is highly compatible with general-purpose computer systems. For example, by mounting a satellite tuner card in a general-purpose computer system, by analyzing received EPG data in a computer, and by window-displaying a program menu on a computer display, program changes and recording program settings can be realized by an operation using a mouse and cursor keys. Of course, broadcast data can also be digitally recorded as it is in a hard disk contained in a computer.

Also, by transmitting data other than that for video, it is possible to increase interactivity in broadcast programs. For example, in the case of a broadcast program which provides multiple-choice questions, by transmitting an answer together with video data, on the television receiver side, answer menu buttons are prepared on the computer display, and answer checking can be performed in response to an answering operation using the mouse and cursor keys.

Furthermore, if interactivity is improved, a television receiver in a household, in addition to handling video content, can be expected to make a great advance as an information control station. For example, a television receiver can also become an Internet terminal or an electronic commerce terminal.

In efforts in digital satellite broadcast standardization, as a form (format) of digital broadcast data, use of MHEG (Multimedia and Hypermedia Expert Group) has conventionally been studied. MHEG is one type of markup description language that uses tags which define data attributes, and assumes applications in which multimedia contents are displayed on a television and a viewer extracts desired information in video on demand (VOD) and digital television broadcasts. For example, in a CS digital broadcast (SKYPerfectTV) in Japan, MHEG-5 is adopted.

However, in the MHEG, the definitions of tags are predetermined, and extendibility is lacking. That is, since only tags which are defined uniquely can be used for description, for example, a considerable amount of correction is necessary even to change one function (API (Application Programming Interface)). Also, since MHEG is designed for commercial broadcasts and specifies a method of presentation, it has a relatively low compatibility with general-purpose computers.

Accordingly, in place of MHEG, a specification based on XML (extended Markup Language) is being studied. As is already well known in the industry, similarly to HTML (Hyper Text Markup Language) which is the Internet description language at present, XML is a markup description language which delimits content data using tags in order to specify the attributes thereof. It is also possible for XML to embed a link (that is, to access information (reference) to another resource object) into contents in a manner similar to HTML.

In XML, since the definitions of tags are arbitrary, that is, there is no limitation on the way to describe attributes, a high degree of freedom and high compatibility with computers and the Internet are points which can be mentioned as being more advantageous than in MHEG. Also, planning for XML to become the next generation Internet description language is under way.

As a result of the adoption of XML, the compatibility of broadcast data with respect to computers is further improved. Also, since the compatibility with the Internet is great, it is easy to provide a digital television receiver with the role of an Internet receiving terminal.

The specifications of XML can be broadly classified into "basic XML" and "advanced XML" (which is an extended version of the basic XML). The basic XML specifies that the presentation form for expressing transmission contents on a display be described using tags.

In contrast, in the advanced XML, attribute information of transmission contents can be added. A conversion that defines a method (that is, the grammar of tags) for describing attribute information is a standard convention called "DTD (Document Type Definition)". Although DTD is fixed in the basic XML, in the advanced XML, DTD can be defined as desired, and for example, DTD can be defined for each industry. The attribute information referred to herein includes information necessary for each apparatus to understand the meaning of contents and to process them when a connection is made among different apparatuses, such as a television receiver and a computer.

Also, a method for expressing XML contents (that is, a presentation form on a display and a print output form to a printer) is described by a style sheet which is a document which differs from the DTD. For example, by changing the typefaces, the sizes thereof, the colors, etc., in the description order in the style sheet, the same DTD contents can be expressed in a completely different form. The style sheet is transmitted as a file which differs from the DTD. The style sheet for an XML document is specifically called "XSL (eXtensible Stylesheet Language)". XSL has attracted attention as a conversion language for XML documents in addition to its primary function of a style sheet.

As shown in FIG. 17, the distribution of XML contents involves DTD and XSL documents in addition to an XML document. However, the document body is not necessarily limited to an XML document and may be in another markup language format, such as SGML (Standard Generalized Markup Language) and HTML. Also, in the case where a document described by XML is applied to, for example, a television broadcast, and it operates together with other multimedia contents so as to perform the presentation of the contents, it is assumed that the multimedia content is also contained in the document body.

On the receiving side, these received documents are parsed by a syntax analysis program called an "XML parser". The XML parser analyzes an XML document by using a DTD document and outputs a document object. This document object is a structured document in which a tree structure is formed according to the tags in the original XML document.

Then, this document object is converted by a conversion program called an "XSL processor". The XSL processor converts an XSL document into, for example, a script form and converts a document object into an expression form in conformance with the description of an XSL document. For example, a document described in an advanced XML format can be converted into a document of an HTML form which can be browsed by what is commonly called an "HTML browser", or can be converted into a custom document which can be browsed by a custom browser other than HTML.

As stated earlier, even in the case of the same XML content, form of the display on the display screen differs greatly merely by changing the style sheet. That is, the style sheet has a role in providing an added value to the original XML content. In the future, the value of the style sheets will increase further, and it is anticipated that attractive, elaborate style sheets will be produced by professional designers.

However, as style sheets, that is, the XSL documents comes to have added functionality or a great added value, the document size increases. In the case of a complex style sheet, there is a possibility that the data size will be larger than the XML document body. If such a large XSL document is transmitted each time an XML document is transmitted, there will be excessive load on the limited bandwidth. In particular, if a style sheet in a fixed form, such as an electronic program guide or an advertisement, is transmitted each time, the amount of bandwidth used is considerable.

On the other hand, a style sheet having an additional value, such as that produced by a professional designer, is separated from the XML document body, and even the style sheet itself can be a commodity, that is, an object for commercial transaction. Also, since the style sheet itself has a use value as authored works, it is necessary to protect against use without permission and unauthorized use.

Therefore, a technology for effectively managing style sheets and a protection technology capable of preventing use without permission of style sheets are desired.

SUMMARY OF THE INVENTION

An object of the present invention is to provide a superior style sheet management technology which is capable of appropriately managing style sheets which define the expression form, etc., of digital data in a computer language format. Digital data in a computer language format is described by, for example, a markup language (for example, XML (eXtensible Markup Language)) in which tags which can be defined arbitrarily are used.

Another object of the present invention is to provide a superior style sheet management technology which is capable of appropriately managing style sheets (for example, XSL (eXtensible Stylesheet Language) data) defining the expression form, etc., of an XML document.

Yet another object of the present invention is to provide a superior style sheet management technology which is capable of appropriately preventing use without permission of style sheets (for example, XSL (eXtensible Stylesheet Language) data) for defining the digital data expression form, etc., such as that described by, for example, an XML format.

The present invention has been achieved in consideration of the above-described objects. In accordance with a first aspect of the present invention, there is provided a data distribution method and apparatus for distributing data described by a computer language, comprising: a step or means for adding a content identifier which is unique to a distribution data content in a computer language format to the data content; a step or means for adding a style identifier which is unique to a style sheet which defines the expression form of the distribution data content to the distribution data content; and a step or means for distributing the distribution data content. The computer language herein refers to a markup language in which tags which can be defined arbitrarily are used, an example thereof being an XML (eXtensible Markup Language) language.

The data distribution method or apparatus in accordance with the first aspect of the present invention may include a step or means for producing a disenabled style using-right key and adding it to the distribution data content. This style using-right key may be produced by concatenating, for example, a content identifier and a style identifier.

The step or means for distributing the distribution data content does not necessarily involve the distribution of a style sheet corresponding to the style identifier added to the distribution data content.

In a second aspect of the present invention, there is provided a data receiving method or apparatus for receiving data described by a computer language, wherein a distribution data content in a computer language format is received in a form in which a unique style identifier is attached to a style sheet which defines the expression form of the distribution data content. The "computer language" herein refers to, for example, a markup language in which tags which can be defined arbitrarily are used, an example thereof being an XML (eXtensible Markup Language) language.

In the data receiving method or apparatus in the second aspect of the present invention, a distribution data content to be received may have a disabled style using-right key produced using a style identifier. In this case, the data receiving method or apparatus preferably includes a step or means for enabling the style using-right key in accordance with a purchase procedure.

The data receiving method or apparatus in accordance with the second aspect of the present invention may further comprise: a step or means for performing authentication using an enabled style using-right key; and a step or means for allowing the application of the style sheet in response to the authentication being successful.

In accordance with a third aspect of the present invention, there is provided a data receiving apparatus for distributing data in a computer language format, comprising: a first storage section for storing a data content in a meta-language form within the received data; and a second storage section for storing a style sheet which defines the expression form of the data content independently of the data content. The computer language herein refers to a markup language in which tags which can be defined arbitrarily are used, an example thereof being an XML (eXtensible Markup Language) language.

The second storage section can perform management according to a style identifier possessed uniquely by each style sheet.

According to the receiving system embodying the present invention, style sheets can be stored separately from digital data described by a computer language, and can be managed. As a result, there is no need to individually add a style sheet to each distribution data body and to transmit it, making it possible to reduce the amount of the data transmitted. In particular, in the case where the style sheet comes to have added functionality and is large, the reduction in communication load is enormous. It is also possible to realize an environment in which only the style sheet is reused. The computer language herein refers to, for example, a markup language in which tags which can be defined arbitrarily are used, an example thereof being an XML (eXtensible Markup Language) language.

In addition, according to the receiving system of the present invention, since a style sheet is protected against unauthorized use by attaching key data thereto, it is possible to manage the style sheets as authored works. Furthermore, provision of a means for specifying the other party or for performing authentication also makes limited use of the style sheet possible.

Further objects, features, and advantages of the invention will be apparent from the following detailed description taken in conjunction with the embodiments of the present invention, to be described later, and the accompanying drawings.

BRIEF DESCRIPTION OF THE DRAWINGS

FIG. 8 shows a source code of an XML document.

FIG. 17 schematically shows the procedure for processing XML contents.

DESCRIPTION OF THE PREFERRED EMBODIMENTS

Embodiments of the present invention will now be described below in detail with reference to the drawings.

Figure 1:
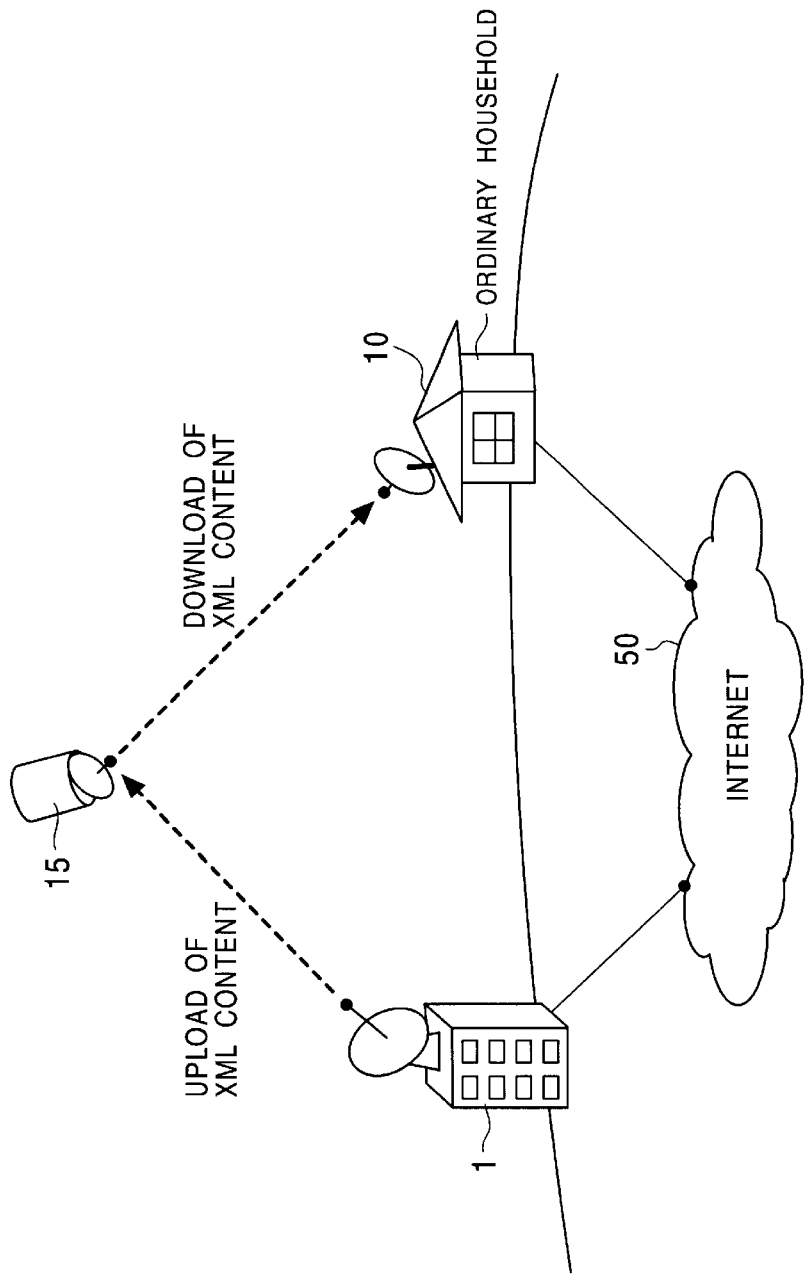
FIG. 1 schematically shows the construction of a digital satellite broadcast system 100 according to an embodiment of the present invention.

FIG. 1 schematically shows the construction of a digital satellite broadcast system 100 according to an embodiment of the present invention. As shown in FIG. 1, the digital satellite broadcast system 100 comprises a broadcast station (broadcast server) 1 for providing broadcast services, a broadcast satellite 5 for relaying broadcast data, and a receiving station (receiver/decoder) 10 for receiving the broadcast data from the broadcast satellite 5. There is at least one broadcast station 1 on the ground, and the broadcast satellite 5 is positioned high up above the earth. Also, the receiving station 10 corresponds to an ordinary household, and in practice, a large number of them are present on the ground. Data distribution via the broadcast station 1 and the satellite 5, that is, a broadcast, is one-way communication.

In the digital data broadcast, data transmission is performed at a transfer rate of 10 to 50 Mbps. In this embodiment, data distributed by the broadcast station 1 is digital contents in an XML (eXtensible Markup Language) format, and contains an XML document, a DTD document, and an XSL document (however, there are cases in which an XSL document is not contained). Also, distribution data is usually compressed by an MPEG-2 (Moving Picture Experts Group) format.

Each receiving station 10 and the broadcast station 1 may be connected bidirectionally by a wide-area network 50, such as the Internet, or by a dedicated line. For example, it is also possible to provide a partly on-demand broadcast service using the Internet 50. However, in this case, it is preferable that they be connected by a high-speed analog telephone line of 56 kbps or more, high-speed wireless communication of about 10 to 64 kbps, ISDN (Integrated Services Digital Network) of 128 kbps, or cables in a class of 5 to 30 Mbps.

Figure 2:
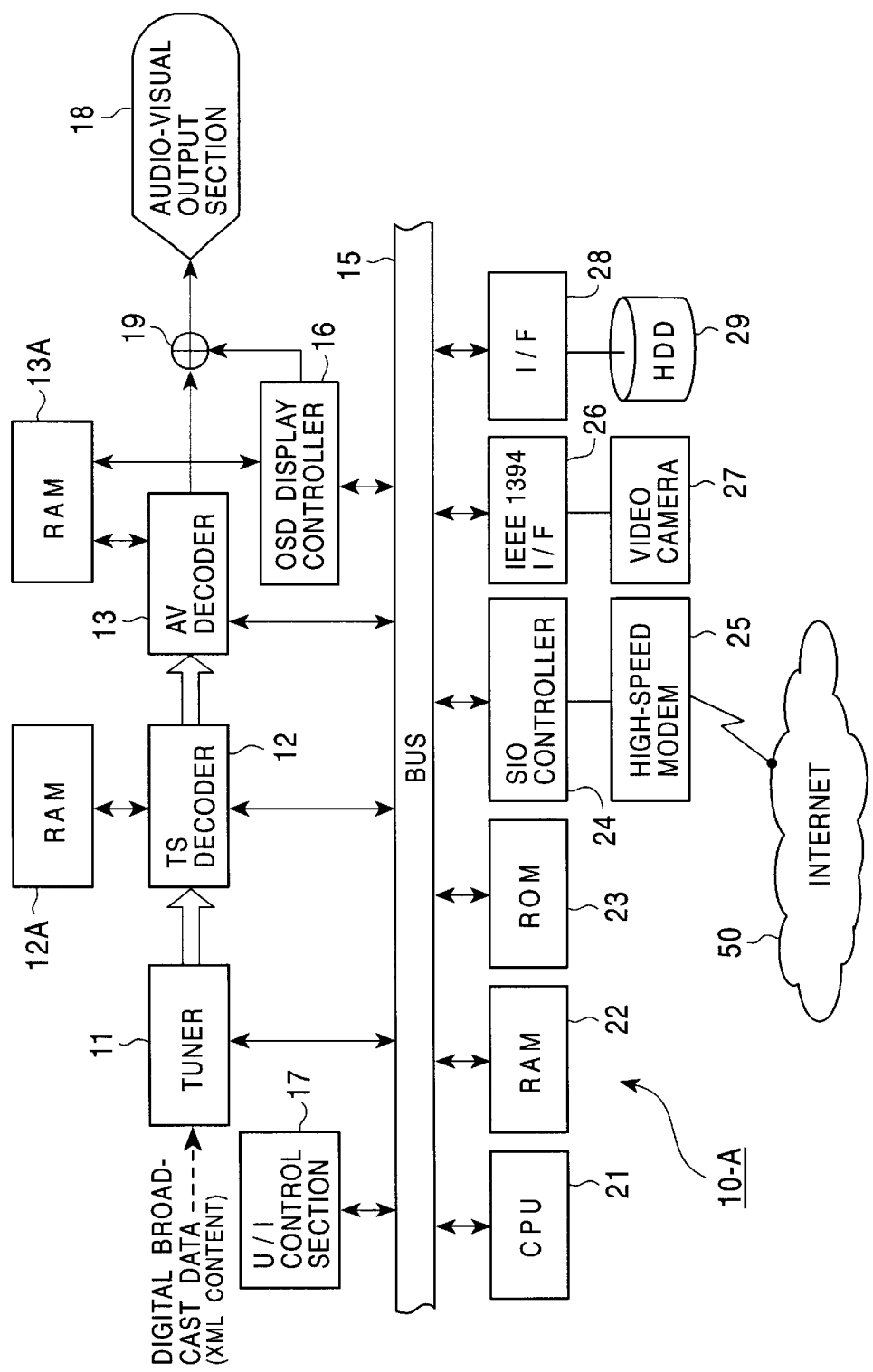
FIG. 2 schematically shows the hardware construction of an example of a receiving system 10-A in a receiving station 10 (that is, an ordinary household) and, more specifically, shows a receiving system 10-A mounted in a form called an "STB (set top box)".

FIG. 2 schematically shows the hardware construction of an example of a receiving system 10-A in the receiving station 10 (that is, an ordinary household). The system 10-A is in common use, for example, in the form of an STB (set top box). The hardware components inside the system 10-A are interconnected with each other via a bus 15. Each section will be described below.

Broadcast waves received by an antenna (not shown) are supplied to a tuner 11. The broadcast waves, which conform to a prescribed format, contain, for example, program guide format (EPG (Electronic Program Guide)), etc. In addition to the above-mentioned broadcast waves, cable broadcast waves or terrestrial transmission waves are also possible and this is not particularly limited.

The tuner 11 performs tuning of broadcast waves of a predetermined channel in accordance with instructions from a CPU 21 (to be described later) and outputs it to a TS (Transport Stream) decoder 12. The received data is formed in such a way that data, such as video information, audio information, and program information other than these, is MPEG-compressed and is concatenated serially so as to be a "transport stream". The transport stream is defined by a "transport layer" referred to in an OSI (Open Systems Interconnection) reference model.

Depending on whether an incoming broadcast wave is analog or digital, the construction of the tuner 11 can be changed or expanded as required.

The TS decoder 12 interprets this transport stream, sends video and audio information, that is, an AV data block, to an AV decoder 13, and transmits a data block of program information, etc., other than these, to the CPU 21 via the bus 15. The TS decoder 12 may be provided with a memory 12A for storing work data in its local storage.

The AV decoder 13 interprets AV data transferred from the TS decoder 12, that is, audio and image data, reproduces the original video signal and the original audio signal, and outputs them to an audio-visual output section 18. The AV decoder 13 may be provided with a memory 13A for storing work data in its local storage. Also, the entities of the audio-visual output section 18 include a CRT (Cathode Ray Tube) display (or a flat panel display of a liquid crystal) and a speaker.

A user interface control section 17 is a module for processing an input operation from a user, and has, for example, operation buttons which are directly operated by a user and a remote control unit for remote control operations. Also, a display panel for displaying currently set contents and LED indicators (not shown) may be contained.

The CPU (Central Processing Unit) 21 is a main controller for centrally controlling the entire operation of the receiving system 10-A. The CPU 21 can execute various software programs (to be described later) for processing XML contents, such as XML parsing, XSL processing, or browsing, on the platform provided by the operating system (OS).

A RAM (Random Access Memory) 22 is a writable volatile memory which is used to load an execution program code of the CPU 21 and to write work data of the execution program. Also, a ROM (Read Only Memory) 23 is a read only memory for permanently storing self-diagnostic and initialization programs which are executed when the power of the system 10-A is switched on and microcodes for hardware operations.

A serial input/output (SIO) controller 24 is a peripheral controller for exchanging data in a serial manner with apparatuses outside the system 10-A. In a serial port prepared by the SIO controller 24, a high-speed modem 25 (for example, having a transfer rate of 56 Kbps) for modulating and demodulating transmission data in an analog telephone line is mounted. As a result of PPP connection to a predetermined access point (not shown) by the modem 25, the system 10-A is connected to the Internet.

An IEEE 1394 interface 26 is a high-speed serial interface which is capable of data transmission and reception of about several tens of Mbps. An IEEE 1394-compliant external apparatus can be daisy-chain-connected or tree-connected to the IEEE 1394 port. Examples of an IEEE 1394-compliant apparatus include a video camera 27, a scanner (not shown), etc.

A hard disk drive (HDD) 29 is an external storage device for storing programs and data in a predetermined file format, and usually, has a large capacity of about several GB. The HDD 29 is connected to the bus 15 via an interface 28.

An OSD display controller 16 is a dedicated controller for displaying data of an OSD (Open Software Description) format on a screen.

In this receiving system 10-A, the CPU 21 controls the tuning operation of the tuner 11 and controls the display of program information in accordance with a user input command via the user interface control section 17. That is, program information supplied from the TS decoder 12 is processed to be converted into data for display, and this data is supplied to the OSD display controller 16. The OSD display controller 16 generates an image signal of the program information based on this display data and supplies it to a mixer 19. The mixer 19 mixes a video signal supplied from the AV decoder 13 and a video signal supplied from the OSD display controller 16, and outputs it to the audio-visual output section 18.

The OSD is a format for describing information for distributing and installing software, and in combination with CDF (Channel Definition Format), is adapted for push distribution and automatic installation of programs. The OSD originated from the proposal by Marimba Inc. and Microsoft Corporation, and is supported by Netscape Corporation, CyberMedia Limited, InstallShield Software Corporation, and others.

Figure 3:
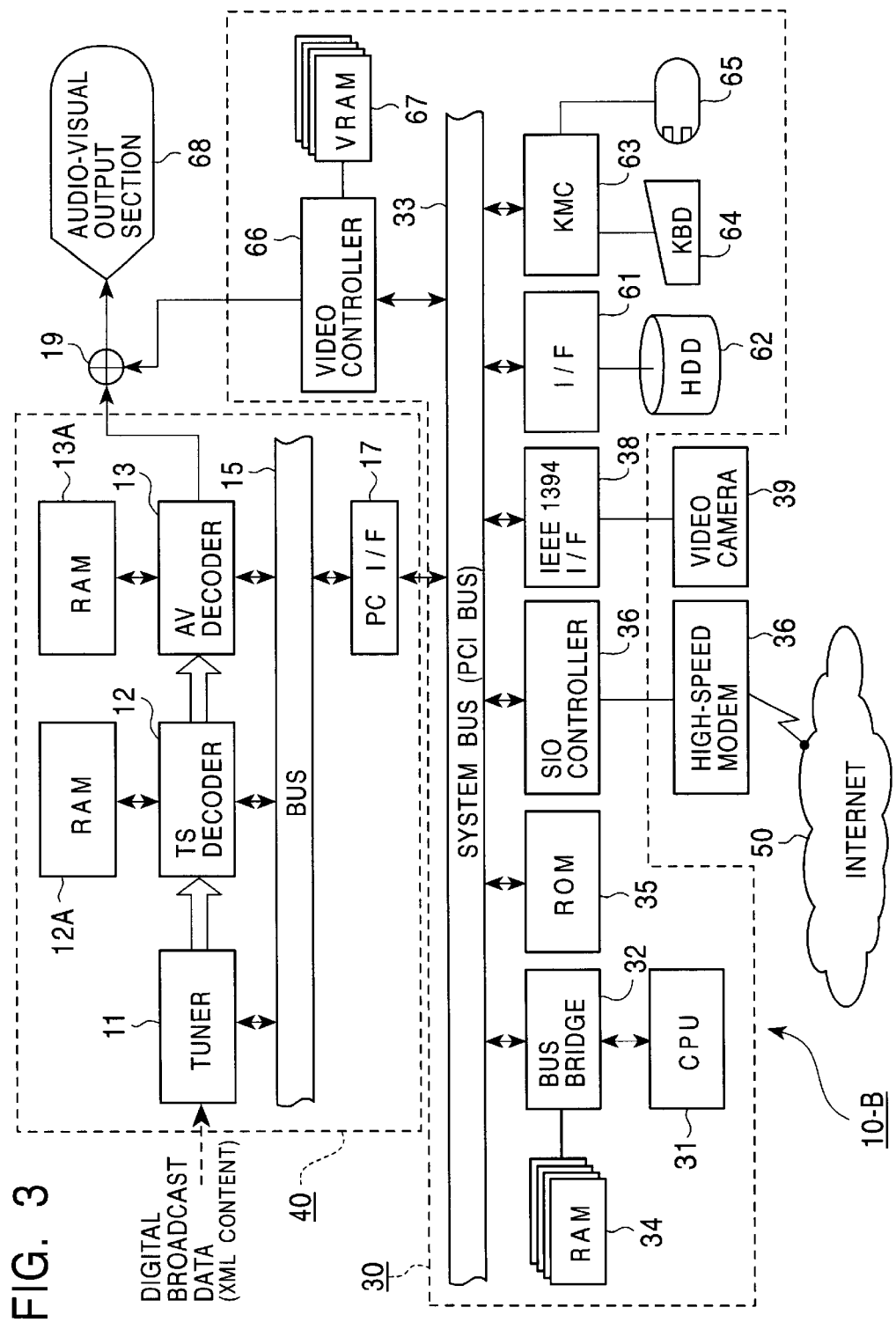
FIG. 3 schematically shows the hardware construction of a receiving system 10-B according to another embodiment of the present invention and, more specifically, shows the hardware construction of the receiving system 10-B mounted in a form in which a general-purpose computer system is equipped with a tuner card for a digital satellite broadcast.

FIG. 3 schematically shows the hardware construction of a receiving system 10-B according to another embodiment of the present invention. The receiving system 10-B is mounted in such a configuration that, for example, a general-purpose computer system 30 is equipped with a digital tuner card 40 for a digital satellite broadcast.

The digital tuner card 40 comprises the tuner 11, the TS decoder 12, the AV decoder 13, and RAMs 12A and 13B. Each function of the tuner 11, the TS decoder 12, and the AV decoder 13 is nearly the same as that of the example shown in FIG. 2, and accordingly, no further description thereof is given here.

On the other hand, the general-purpose computer system 30 contains a printed wiring board (not shown) on which main circuit components, including a CPU 31 (to be described later), are mounted. The board is also called a "motherboard". An example of the general-purpose computer system 30 is a PC/AT compatible of IBM Corporation and successors thereof. The tuner card 40 described earlier is provided in the form of, for example, an "adapter card", and is mounted to a bus slot (not shown) provided in the motherboard. The tuner card 40 mounted to the bus slot is connected to a bus (PCI bus) inside the computer system 30 via the PCI interface 17 (which is shown in the figure).

The tuner card 40 is provided, not as an adapter card, but in the form of a PC card compliant with the planned specifications of PCMCIA (Personal Computer Memory Card International Association) and JEIDA (Japan Electronic Industry Development Association), and may be incorporated into the system configuration by being inserted into a PC card slot.

The CPU 31 is a main controller for centrally controlling the overall operation of the computer system 30. The CPU 21 can execute various software programs (to be described later) for processing XML contents, such as XML parsing, XSL processing, and browsing, on a platform provided by the operating system (OS).

A processor bus which is directly connected to external pins of the CPU 31 is interconnected to a system bus 33 via a bus bridge 32.

The bus bridge 32 of this embodiment comprises a data buffer for overcoming a speed difference between the processor bus and the system bus 33, and in addition, a memory controller for controlling the memory access to a RAM 34.

The RAM (Random Access Memory) 34 is a writable volatile memory which is used to load an execution program code of the CPU 21 and to write work data of the execution program. Normally, the RAM 34 is composed of a plurality of DRAM (dynamic RAM) chips.

The bus 33 is a common signal transmission line containing an address bus, a data bus, a control bus, etc. For example, a PCI (Peripheral Component Interconnect) bus corresponds to this. Various types of peripheral apparatuses conforming to the PCI interface specifications are interconnected on the bus 33. An example of a peripheral apparatus is the tuner card 40 described above for a digital satellite broadcast. Each of these peripheral apparatuses is assigned a unique I/O address, and the CPU 31 (more exactly, a program executed by the CPU 31) can realize transfer of data and commands to a desired peripheral apparatus by specifying an I/O address.

A ROM (Read Only Memory) 35 is a read only memory for permanently storing a self-diagnostic program (POST) which is executed when the power of the computer system 30 is switched on and a basic input and output system (BIOS) for hardware operations. The ROM 35 may be formed of, for example, an EEPROM (Electrically Erasable and Programmable ROM) for which electrical erasure and rewriting operations can be performed.

A serial input/output (SIO) controller 36 is a peripheral controller for exchanging data serially with apparatuses outside the system 30. In a serial port prepared by the SIO controller 36, a high-speed modem 37 (for example, having a transfer rate of 56 Kbps) for modulating and demodulating transmission data on an analog telephone line is mounted. As a result of PPP connection to a predetermined access point (not shown) by the modem 37, the system 30 is connected to the Internet.

An IEEE 1394 interface 38 is a high-speed serial interface which is capable of data transmission and reception of about several tens of Mbps. An IEEE 1394-compliant external apparatus can be daisy-chain-connected or tree-connected to the IEEE 1394 port. Examples of an IEEE 1394-compliant apparatus include a video camera 39, a scanner (not shown), etc.

A hard disk drive (HDD) 62 is an external storage device for storing programs and data in a predetermined file format, and usually, has a large capacity of approximately several GB. The HDD 62 is connected to the system bus 33 via an interface 51. Examples of an interface standard for connecting a hard disk drive to the computer system 30 are IDE (Integrated Drive Electronics), SCSI (Small Computer System Interface), etc.

A keyboard/mouse controller (KMC) 63 is a dedicated controller for processing user input from a keyboard 64, a mouse 65, etc. The KMC 63 issues an interruption request to the CPU 31 in response to the detection of a scan code input from the keyboard 64 and to the detection of a coordinate specification input from the mouse 65. In this embodiment, in addition to a normal command input with respect to the computer system 30, an input operation with respect to the receiving system 10-B, such as selection of a channel, can also be performed via the keyboard 64 and the mouse 65.

A video controller 66 is a dedicated controller for controlling the screen display in accordance with a drawing command from the CPU 31 and comprises a frame memory (VRAM) 67 for temporarily storing drawing information. In order to appropriately embody the present invention, the video controller 66 preferably has a drawing performance higher than VGA (Video Graphics Array) (for example, SVGA (Super Video Graphics Array) or XGA (eXtended Graphics Array)).

In this receiving system 10-B, the CPU 31 controls a tuning operation of the tuner 11 and performs program information display control in accordance with a user input command via the keyboard 64 and the mouse 65. That is, the program information supplied from the TS decoder 12 is processed to be converted into data for display, and this data is supplied to the video controller 66. The video controller 66 generates an image signal of the program information on the basis of this display data and supplies it to the mixer 19. In the mixer 19, a video signal supplied from the AV decoder 13 and a video signal supplied from the video controller 66 are mixed, and this is output to the audio-visual output section 18.

In order to construct the digital satellite broadcast system 100, in addition to that shown in FIGS. 2 and 3, numerous electrical circuits, etc., are required. However, these are well known to those skilled in the art and do not constitute the gist of the present invention, and accordingly, are omitted in this specification. Also, it is to be understood that connections among hardware blocks in the figures are only partially shown in order to avoid complexity in the figures.

For example, although not shown in FIGS. 2 and 3, the receiving station 10 may comprise an external storage device, such as an FDD (Floppy Disk Drive), a CD-ROM drive, or an MO drive, in which a transportable recording medium, such as an FD (Floppy Disk), a CD-ROM, or an MO (magneto-optical) disc, are loaded to make data accessible.

Figure 4:
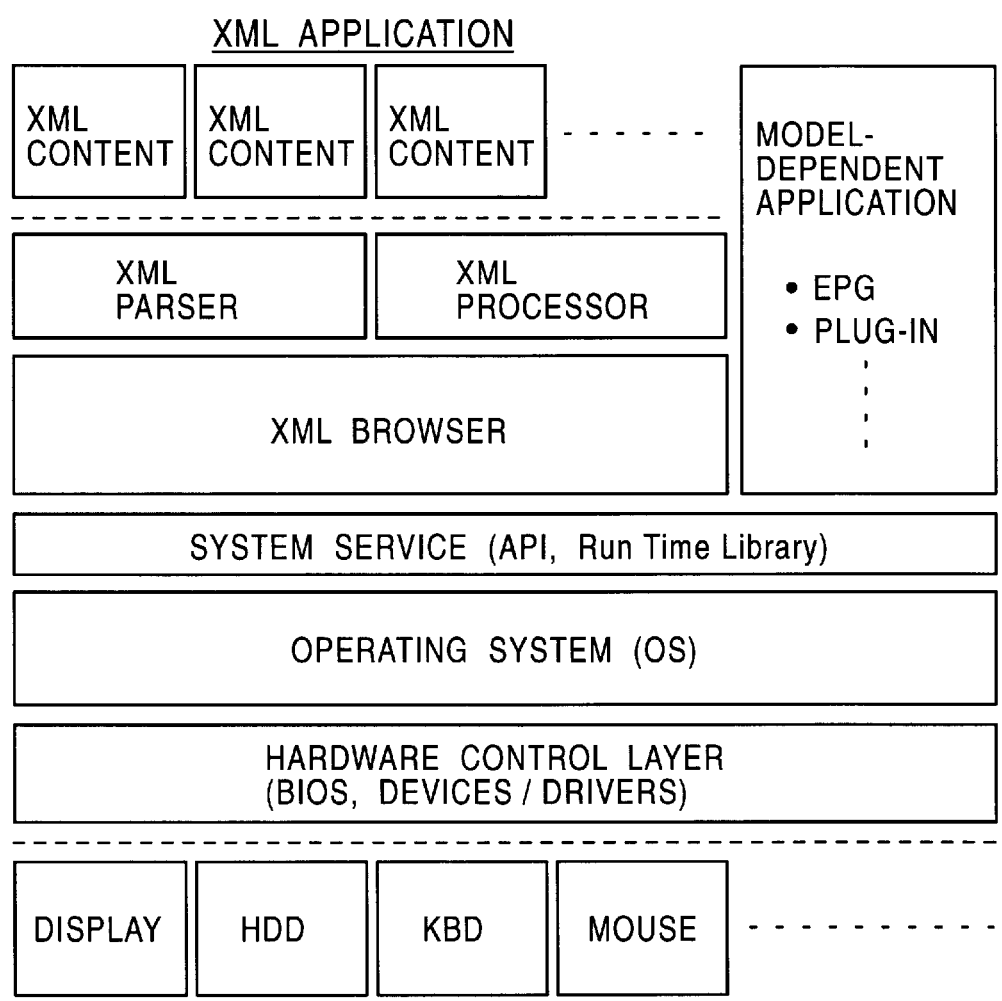
FIG. 4 schematically shows the hierarchical structure in various software programs executed in the digital broadcast data receiving system 10.

FIG. 4 schematically shows the hierarchical structure among various software programs executed by the digital broadcast data receiving system 10. The function of the software of each layer is described below.

The purpose of the hardware control layer of the lowest layer is to overcome differences of hardware with respect to high-order software, such as the operating system (OS), and performs a direct input and output operation with respect to each hardware and a process corresponding to a hardware interruption.

The hardware control layer is supplied to the receiving system 10, for example, in the form of a BIOS (Basic Input/Output System) which is permanently stored in the ROM 23/35 or in the form of a "device driver" installed in the HDD 28/62.

The operating system (OS) is basic software for generally managing the hardware and the software inside the receiving system 10. The OS includes sub-systems, such as a "file manager" for managing recording of files on the HDD 28/62, a "memory manager" for managing memory space, a "resource manager" for managing assignment of system resources, a "scheduler" for managing task execution, and a "window system" for controlling the window display on the display.

The system services are a set of functions by which an high-order program, such as an application, calls each function with respect to the OS. API (Application Programming Interface) and a run-time library correspond to this. Due to the presence of the system services, it is unnecessary for the application to directly operate each piece of hardware, and thus, the integrity of hardware operations is ensured.

An XML application corresponds to an XML content and is an XML document described by a markup language with tags of XML, which can be defined arbitrarily. Each XML document is accompanied by a DTD document for document-type definition and an XSL document (style sheet) which defines the expression form.

An XML parser is a software program which analyzes an XML document by using a DTD document and transfers a document object as an analysis result to the XSL processor. This document object is a structured document in which a tree structure is formed in accordance with tags in the original XML document.

The XSL processor is a software program for converting a document object into an expression form conforming to the description of an XSL document. The document converted by the XSL processor can be browsed by an XML browser. Also, by using another XSL document, a document object can be converted into a document which can be browsed by another browser (for example, an HTML browser, or another custom browser).

Next, a description is given of the procedure for receiving an XML document in the satellite data receiving station 10.

Figure 5:
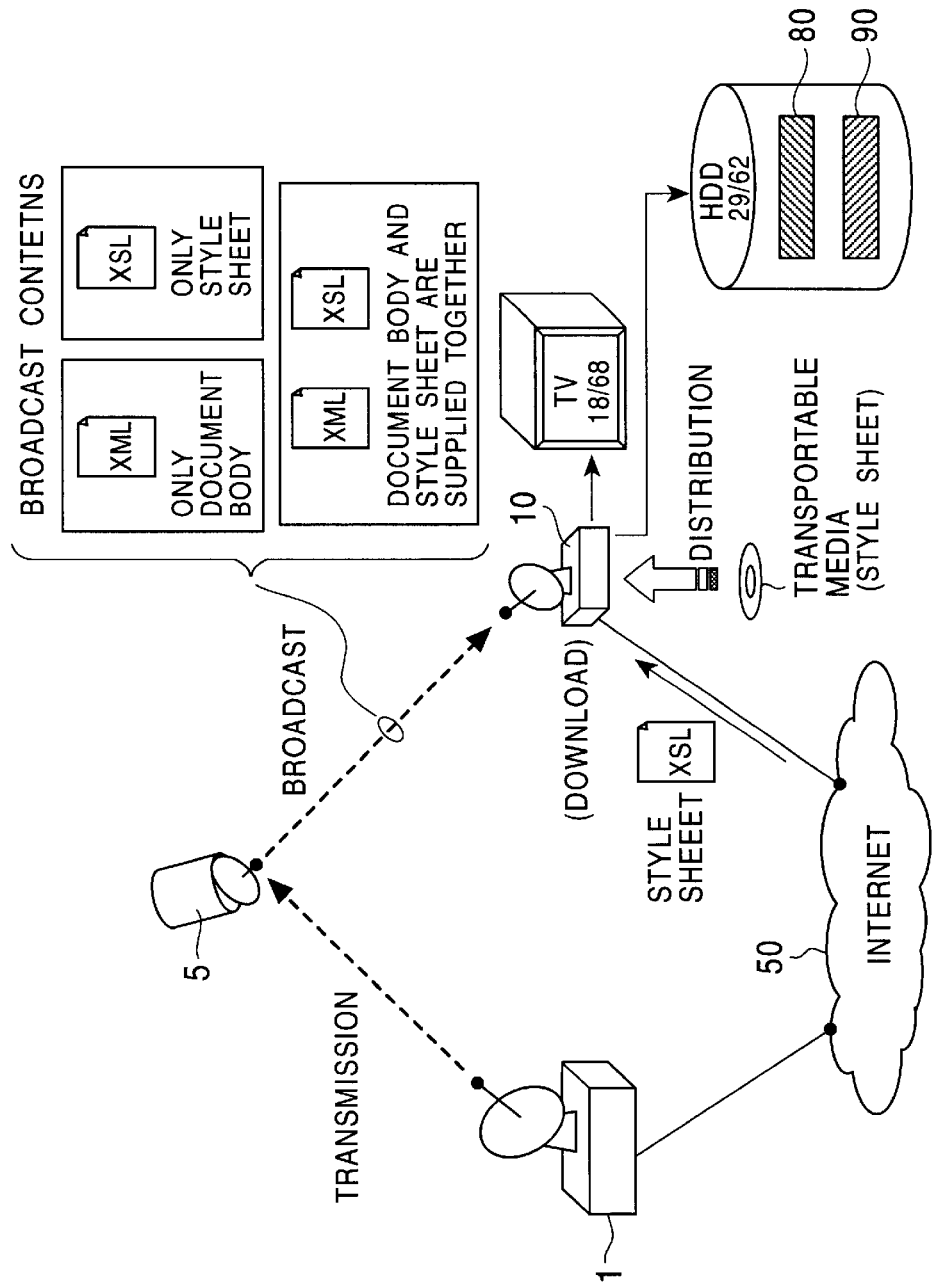
FIG. 5 schematically shows a state in which a broadcast content is transferred from a broadcast station 1 to the receiving station 10 via a satellite 5.

In the digital satellite broadcast system, as shown in FIG. 5, initially, a content is transmitted from the broadcast station 1 to the broadcast satellite 5, and the content is transferred from the satellite 5 to the receiving station 10.

The broadcast content is composed of a document body (however, a DTD document may also be contained) described in an XML format, and a style sheet described in an XSL format. In the XML document body, information other than style information which defines how the content will be displayed is contained (for example, text, multimedia content, such as an image object to be used for that text, etc.).

In a one-way broadcast environment, such as in a satellite broadcast, a content described by a standard XML language is transmitted in a form in which an XML document and a style sheet are supplied together.

On the receiving system 10 side, necessary data within the received data is stored once in a large-capacity storage device, such as the HDD 29/62. In the case where the received data is a document in a markup language format, such as XML, it is processed inside the receiving system 10, and it is output to the screen of the display apparatus 18/68, such as a TV.

Also, in this embodiment, a case is also considered in which the content transmitted via the broadcast satellite 5 is only the XML document body or only the XSL document in addition to a case in which the XML document and the XSL document are supplied together. Also, the supply of the XSL document can be received in the form of distribution by a means other than by a broadcast, for example, by file downloading via a network such as the Internet, or by being carried in a transportable recording medium, such as an FD or a CD-ROM.

In the receiving system 10 according to this embodiment, the supplied XML document and the supplied XSL document are stored separately. That is, in the HDD 29/62 for storing these supplied documents and files, a document body storage section 80 for storing and managing only an XML document (however, a DTD document may also be contained), and a style sheet storage section 90 for storing and managing only an XSL document as a style sheet, are provided.

As described above, the style sheet has come to have added functionality and a greater added value, and the style sheet, that is, the XSL document itself, has come to have characteristics of authored works in a manner similar to the document body. Therefore, in order to prevent use without permission and unauthorized use of a style sheet, it is preferable that the style sheet storage section 90 be a storage area whose security is maintained.

In this embodiment, a style using right key is introduced so that use of a style sheet, that is, an XSL document, is limited, and this point will be described later in detail.

Figure 6:
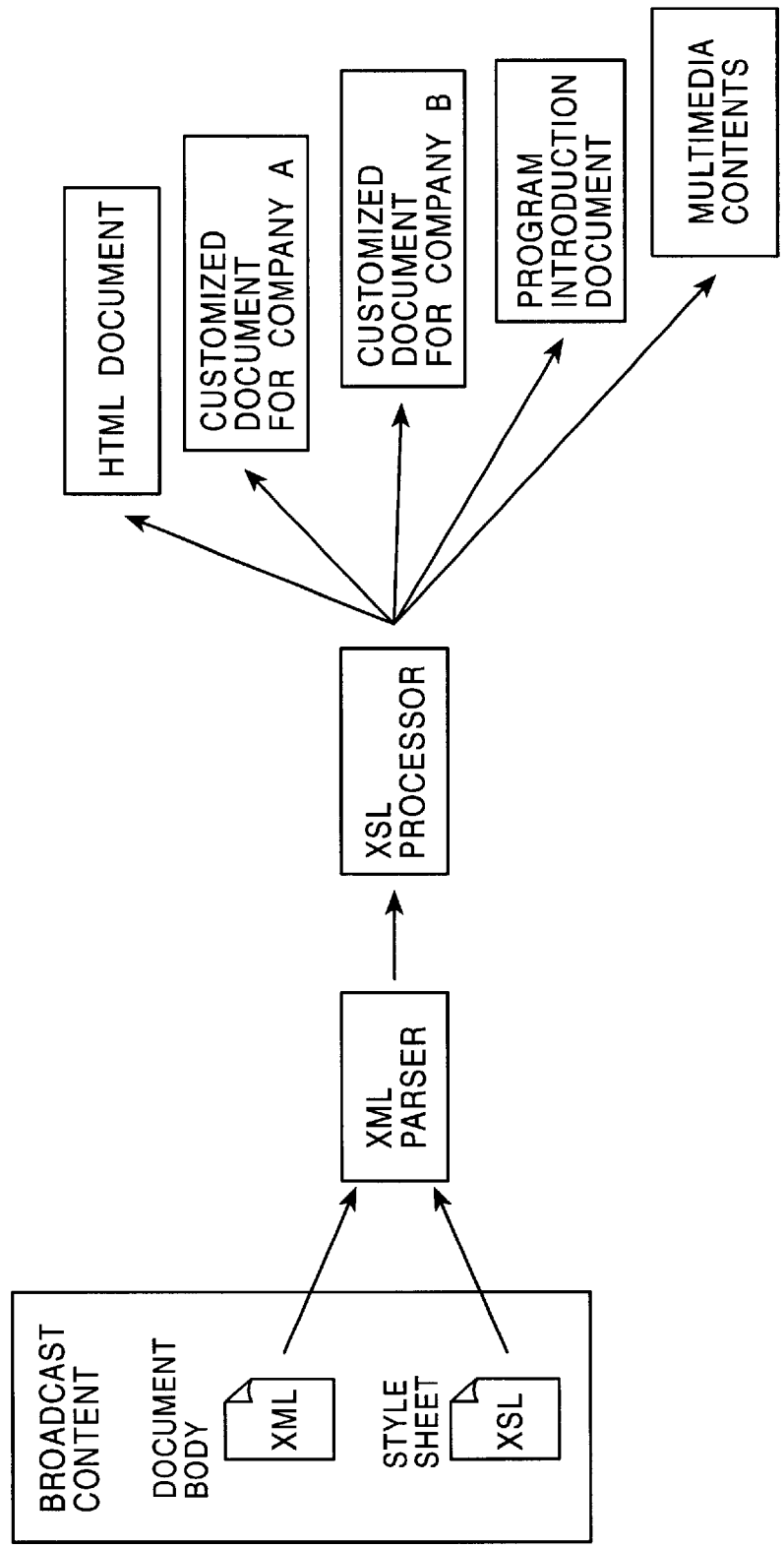
FIG. 6 schematically shows the procedure in which a style sheet is used in the receiving system 10.

Next, a description is given of the procedure for using a style sheet in the receiving system 10 with reference to FIG. 6.

As described above, the receiving system 10 can obtain a style sheet in a state in which the style sheet is supplied together with the document body, that is, the XML document, or the style sheet is separate from the document body. The document body is not necessarily limited to an XML document, and may be in another markup language format, such as SGML (Standard Generalized Markup Language) and HTML. In a case where the XML document is applied to, for example, a TV broadcast, and operates together with other multimedia content so as to perform presentation of the content, it is assumed that the multimedia content is also contained in the document body. Also, the style sheet is a document which is described in an XSL format and which defines the expression form of the XML document body.

The document body may contain a DTD document in addition to an XML document. The document body is parsed by a syntax analysis program called an "XML parser". Then, the parsed document object is transferred to the XSL processor together with the style sheet, that is, the XSL document.

The XSL processor converts a document object into a drawing-enable data format in accordance with the description of an XSL document so as to create a document in accordance with a style. For example, by changing a style sheet which is applied to the same document body, various documents in a drawing-enable format, such as an HTML (Hyper Text Markup Language) document, a customized document for company A, a customized document for company B, a program introduction document, and multimedia contents, are created.

The HTML document is a document which can be drawn by using what is commonly called an HTML browser, such as "Netscape Navigator" from Netscape Corporation and "Internet Explorer" from Microsoft Corporation. It is to be understood that the customized document for company A and the customized document for company B are documents which can be drawn by a custom browser provided by each of company A and the company B.

Also, according to a document conversion process by the XSL processor, in addition to that described above, it is possible to convert a document into a document for introducing a program, corresponding to each program, and to display it.

Figure 7:
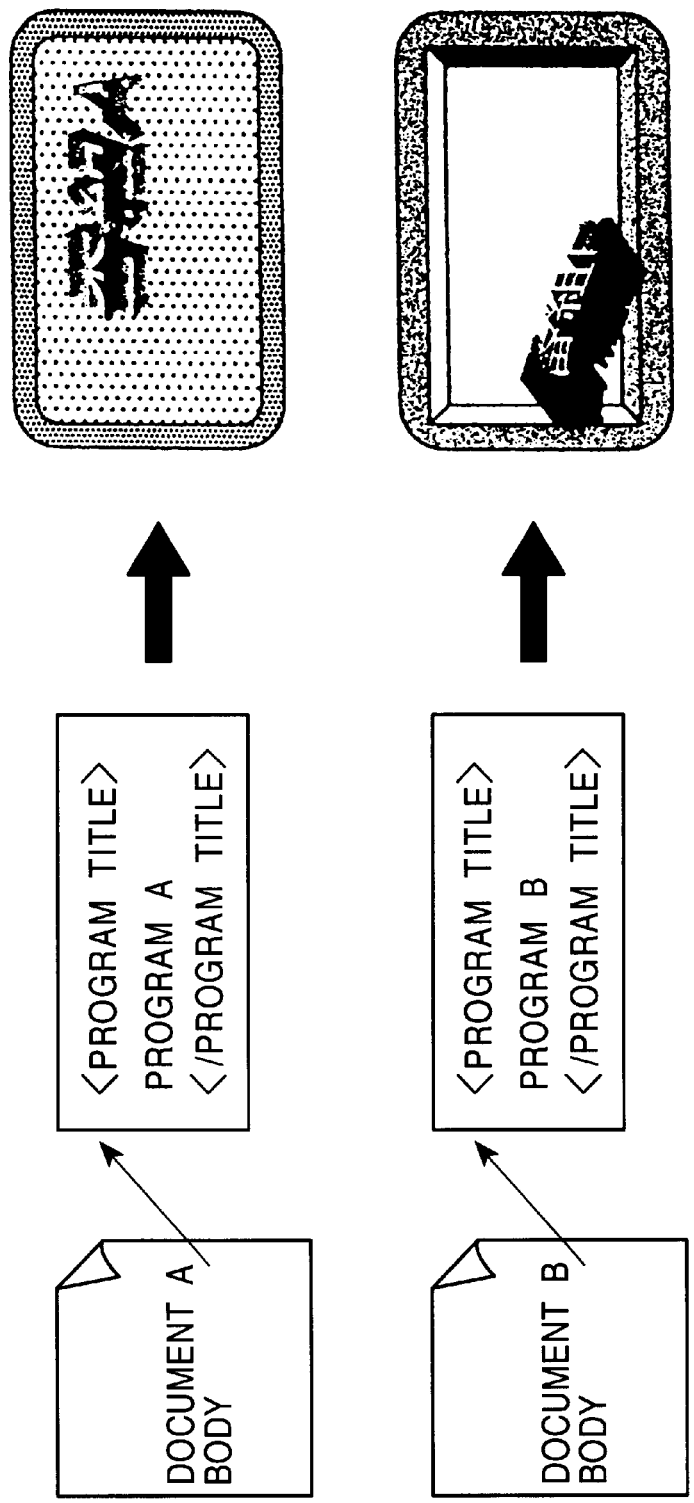
FIG. 7 schematically shows an example in which a display form differs greatly according to a style sheet even if the original program information is the same.

FIG. 7 schematically shows an example in which a display form differs greatly according to a style sheet even if the original program information is the same. In the example shown in the figure, it is assumed that introduction information of program A and that of program B are in the same format. In such a case, by changing the style sheet which is applied to each of the original documents and by performing a different process, an introduction method in each program can be made to differ.

The display shown in FIG. 7 is produced on a display apparatus, such as a TV. However, when the present invention is realized, the display apparatus is not particularly limited. That is, in the specification of a style, a display object can be specified as being for a television or a portable terminal. Also, by selecting a style in accordance with a display function of each apparatus, a more effective display can be realized.

The electronic program guide (EPG) realized in a broadcast is such that program information which is specific to each program is transmitted. For the transmission method therefor, one method uses a dedicated transmission channel and another method uses a V blank in a television broadcast. For this reason, conventionally, the form of program information is determined at the start time of the broadcast services, and the display method therefor is fixed with respect to a receiver.

In contrast, if a style sheet is used according to this embodiment, it is possible to flexibly change the display of the program information, which would conventionally be fixed. Also, since the style sheet can be updated as desired in such a manner as to correspond to program information to be broadcast, the program information itself can be changed easily. It is also possible to change the definition of a program guide for each program and for each service provider.

As described with reference to FIG. 5, the receiving system 10 according to this embodiment has the style sheet storage section 90. Therefore, it is possible for the receiving system 10 to use a style sheet for converting a broadcast content into a drawing-enable format separately from the XML document body.

Furthermore, it is possible to share a single style sheet among a plurality of XML documents, and it is possible to share a plurality of style sheets among a plurality of XML documents.

According to the present invention, it is not necessary to attach a style sheet to the broadcast content, that is, the XML document body, but on the other hand, information for identifying a style sheet to be applied to each XML document is necessary.

Accordingly, in this embodiment, an identifier (style ID) which is unique to each style sheet is defined and added to the style sheet. This style ID allows a style sheet stored in the style sheet storage section 90 to be appropriately managed (for example, a desired style sheet can be easily fetched by merely specifying a style ID).

Also, on the side of the broadcast content, that is, the XML document body, it is necessary to define a content ID. It is preferable that the style ID and the content ID be managed in a centralized way worldwide. In such a case, by merely indicating the combination of the content ID and the style ID, it is possible to specify both the content body which is the object of display and its display form.

In FIG. 8, a source code of an XML document according to this embodiment is shown as an example.

In CONTENTS tags, the name of the contents, the author of the contents, the publisher of the contents, the date on which the contents were issued, and the ID of the contents are specified.

The content ID is an ID, for example, when the content is registered in an organization which manage IDs in a centralized way. It is preferable that content IDs be managed in a centralized way worldwide and be identified uniquely, for example, as is the ISBN (International Standard Book Number) used to manage books.

In a STYLESWITCH tag, an attribute for setting the ID of the style sheet, used by default, is contained. Also, in USESTYLE tags which are generated inside the STYLESWITCH tag, usable style sheet IDs are enumerated.

Figure 9:
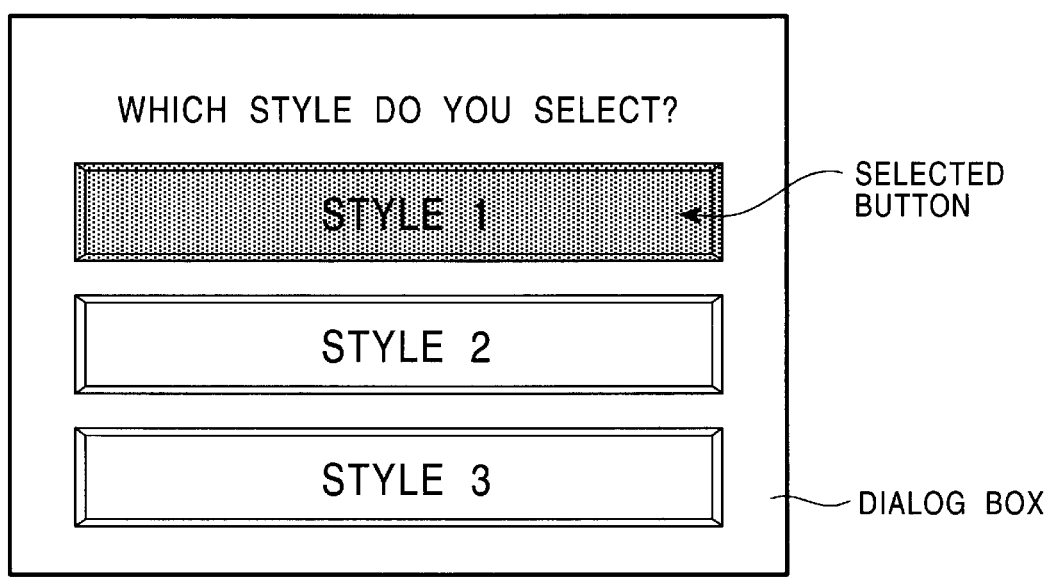
FIG. 9 shows a dialog box for selecting a desired style sheet by a user.

The fact that a plurality of style sheet IDs are enumerated in the USESTYLE tags means that it is possible for the user to select a desired style sheet from among them. For example, in a case where the receiving system 10 is formed of the general-purpose computer system 30 which provides a GUI (Graphical User Interface) environment (see FIG. 3), at the time the broadcast content is introduced to the receiving system 10, the following may be possible, for example, a dialog box (see FIG. 9), in which each style sheet is formed as a button and is displayed, is opened, so that the user is prompted to select a desired style sheet.

Also, in the USESTYLE tags, the ID of the style sheet to be used, and a "using-right key" indicating that the use thereof is permitted are contained.

As has already been described, it is preferable that both the style ID and the content ID be assigned a unique ID as a result of the registration with an organization which performs centralized management. These IDs are used to fetch a document from the external storage device 29/62, to use a style, and to confirm whether or not the user is an authorized user during the document conversion process in the XSL processor.

Next, the use form of a broadcast content according to this embodiment is described in detail. However, it is assumed that the broadcast station 1 as the transmitter first describes program introduction information for introducing program A. This information is hereinafter called a "program A introduction XML document". It is assumed that the program A introduction XML document is described in an XML format and has a program introduction style sheet specific to program A, and that a dedicated style sheet is specified when the content is transmitted. (However, when the present invention is realized, a document for introducing a program is not necessarily required to be in an XML format. For example, the document may be in another markup language format, such as SGML or HTML. Also, a document described by XML, with a multimedia content being contained in the document body, may operate together with other multimedia content so as to perform presentation of the content.)

Figure 10:
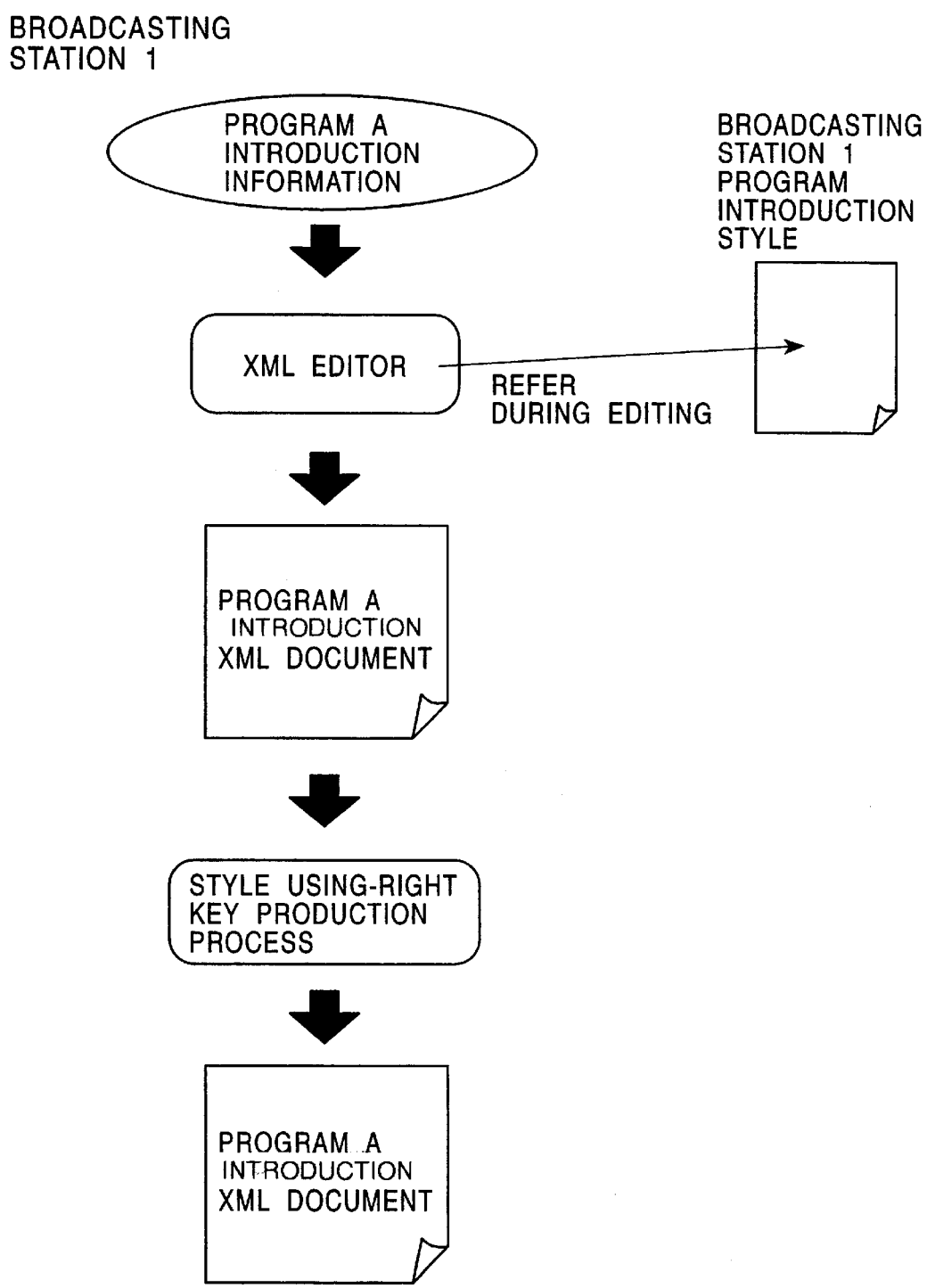
FIG. 10 schematically shows the procedure for producing contents, which is performed in a broadcast content producer (for example, the broadcast station 1).

FIG. 10 schematically shows the procedure for producing content, which is performed by the broadcast content producer (for example, the broadcast station 1). A description will be given below with reference to FIG. 10.

The broadcast station 1 creates an XML document body (which is given a temporary name) for introducing program A by using an XML editor.

Also, the broadcast station 1 prepares in advance a style sheet "broadcast station 1 program introduction style" (temporary name) specific to the program A. When a document is created by the XML editor, introduction information of the program A is created by referring to this style sheet.

As a result of this operation, in the created program A introduction XML document, at least one of the style ID of the broadcast station 1 program introduction style to be used and the content ID for identifying the program A introduction XML document is contained. It is assumed that the style ID and the content ID are managed in a centralized way by predetermined organizations, respectively.

Then, the created program A introduction XML document is transferred to a style using-right key production process module.

The style using-right key produced by this production process module is created as being effective by half as a key. This prevents a style sheet from being used fraudulently (the details of producing the style using-right key will be described later). As a result of this production process module being performed, a program A introduction XML document to which a style using-right key is added is created.

Figure 11:
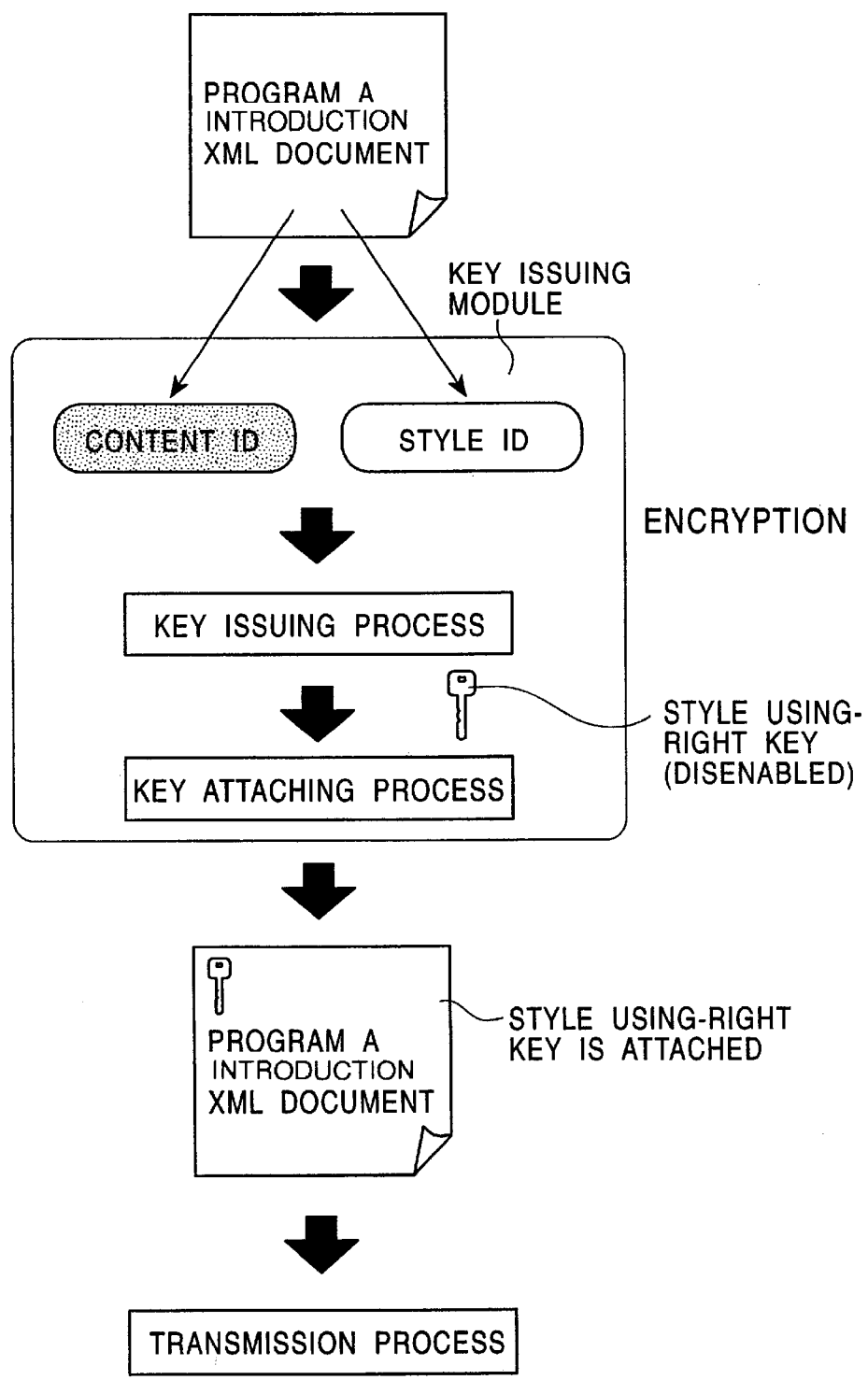
FIG. 11 schematically shows the procedure for producing and using a style using-right key.

FIG. 11 schematically shows the procedure for producing and using a style using-right key. A description will be given below with reference to FIG. 11.

When the content is transmitted, the entire document is transferred to a key issuing module.

Inside the key issuing module, the content ID and the style ID are fetched from the document body. Then, a key issuing process is performed based on these IDs in order to produce a style using-right key. However, the produced key, that is, the style using-right key, is not yet completely enabled at this point in time. The reason for this is that the key is disenabled when the broadcast content is received by a user (an ordinary household, etc.) and is enabled after a content purchase procedure.

The produced style using-right key is attached to the program A introduction document body which is an object for transmission. More specifically, the style using-right key is embedded in the rightKEY attribute of the USESTYLE tag of the document body.

The XML document body created after undergoing the above process is transmitted from the broadcast station 1 toward the broadcast satellite 5, and furthermore, the XML document body is broadcast from the broadcast satellite 5 toward each receiving station, that is, the receiving system 10.

Figure 12:
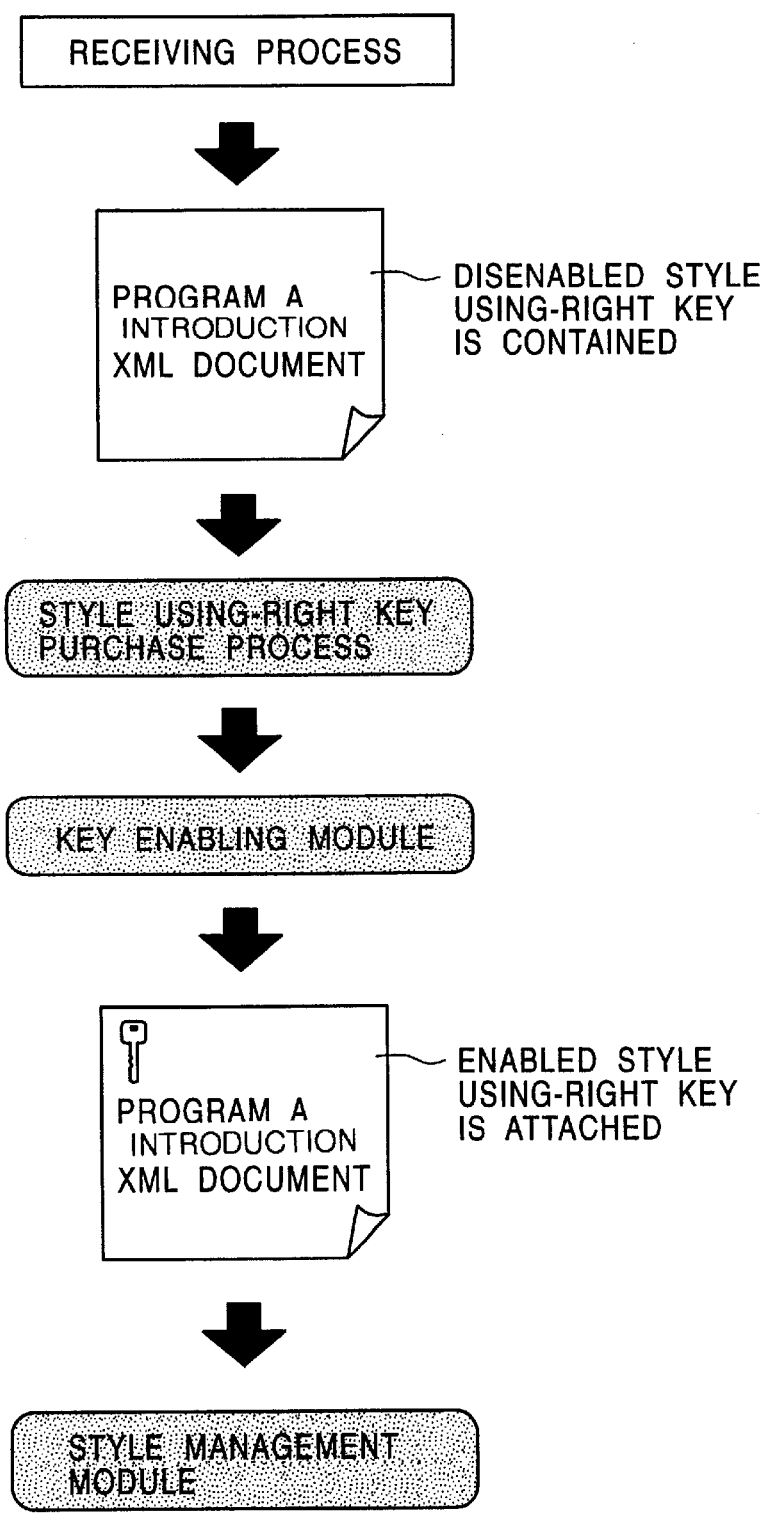
FIG. 12 schematically shows the procedure for using a style sheet in the receiving station 10 side.

Next, a description is given of the procedure for using a style sheet on the receiving system 10 side with reference to FIG. 12.

It is assumed that, on the receiving system 10 side, a broadcast station 1 program introduction style sheet is prestored in the HDD 29/62. For obtaining the style sheet, for example, the style sheet may be supplied together with the broadcast content so as to be received sequentially, and in addition, the style sheet may be automatically received by using a time period other than the time of the main broadcast of the content itself, such as late at night. Alternatively, the style sheet may be distributed via a transportable medium, such as an FD or a CD-ROM. Alternatively, the style sheet may be downloaded via a wide-area network, such as the Internet.

When the program A introduction XML document is received from the broadcast station 1, the receiving system 10 determines that the program be purchased. In response to this purchase determination, the style using-right key within the program A introduction XML document is enabled, and the use of the prestored style sheet (that is, the broadcast station 1 program introduction style sheet) is permitted.

Based on this enabled style using-right key, the style sheet is obtained, the program A introduction XML document is input to the XSL processor, and the XML document is converted into a drawing-enable format. As a result, a display in accordance with the description of the style sheet is provided on the screen of the display 18/68.

Figure 13:
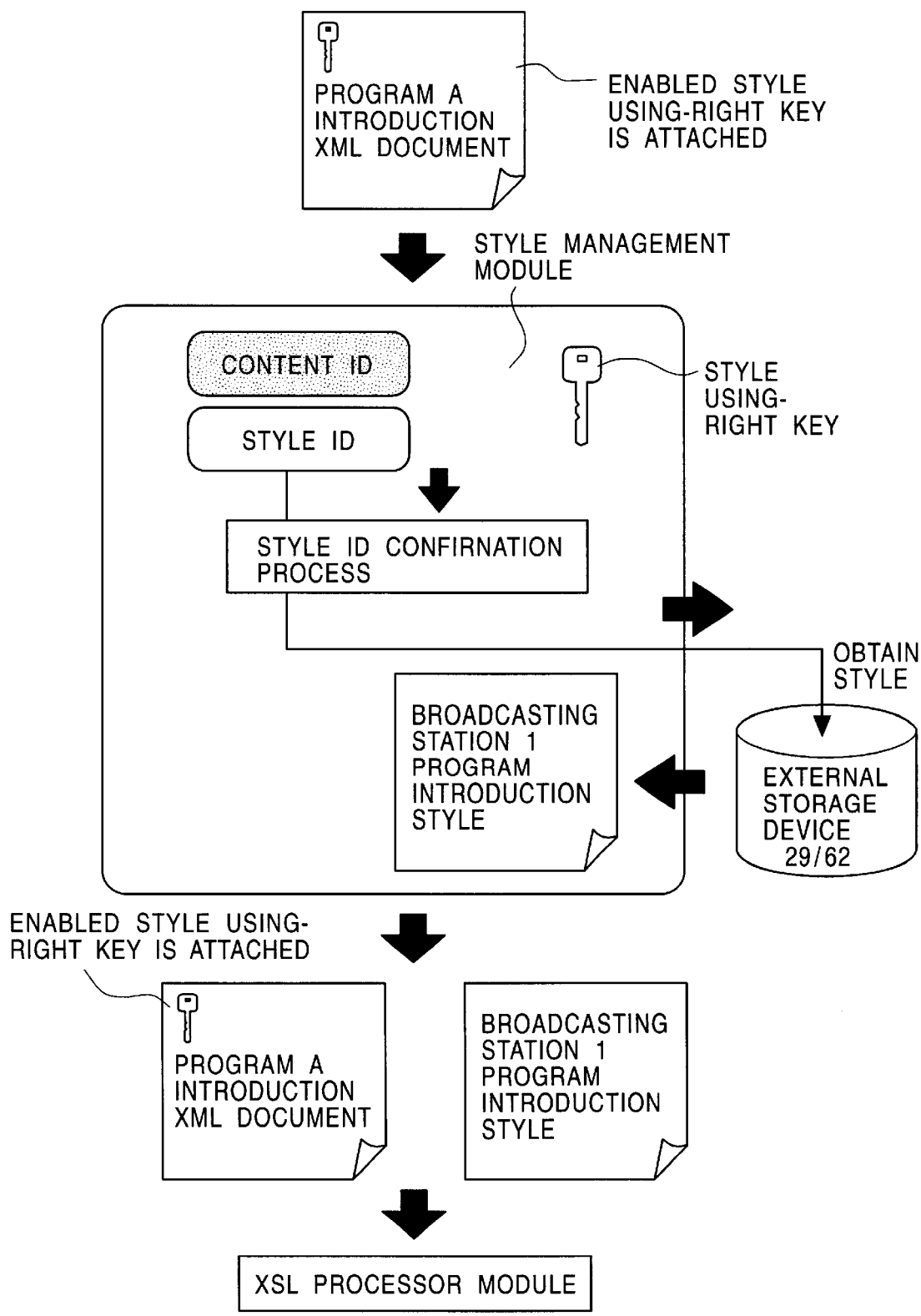
FIG. 13 schematically shows the procedure for obtaining a style sheet by using a style using-right key, which is performed in the receiving station 10 side.
Figure 14:
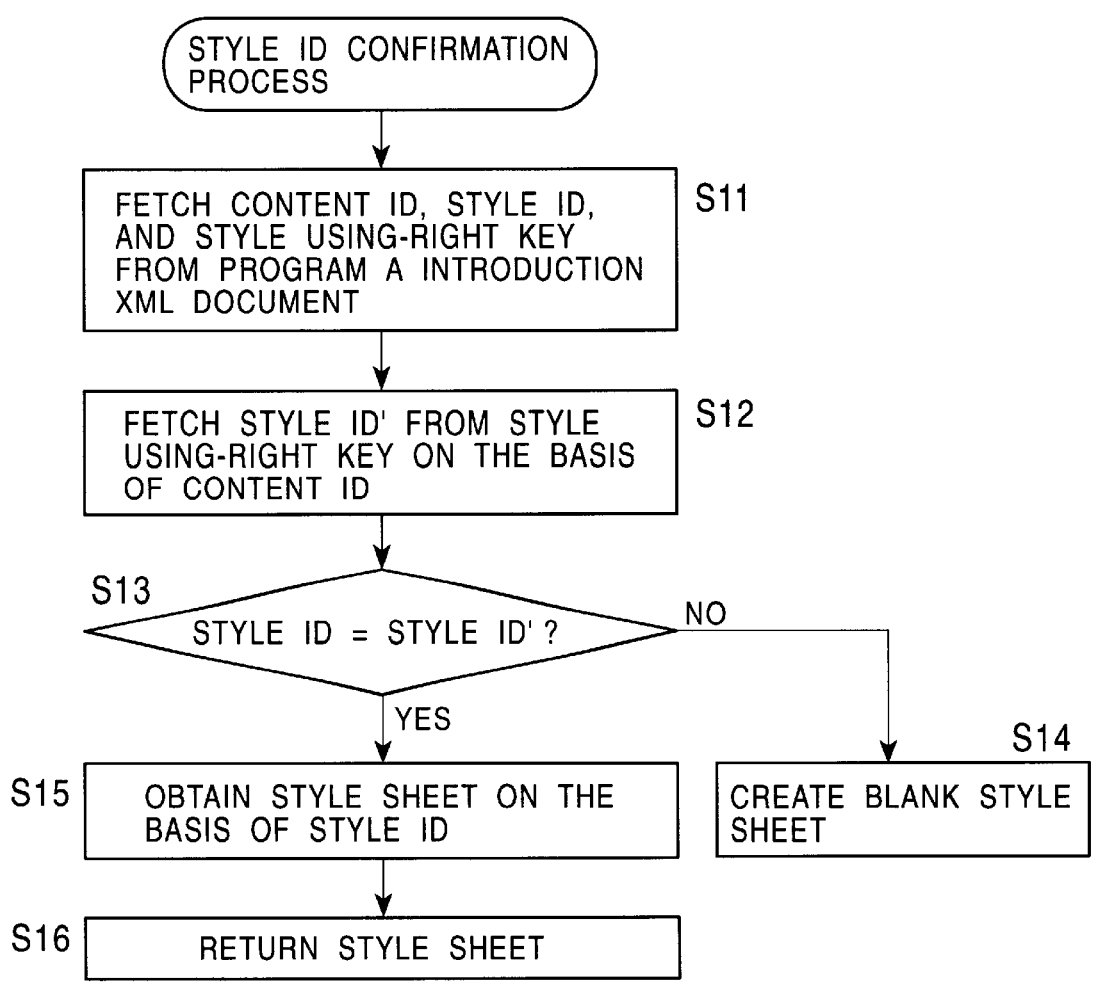
FIG. 14 is a flowchart showing the procedure for obtaining a style sheet by using a style using-right key, which is performed in the receiving station 10 side.

Next, the procedure for obtaining a style sheet by using a style using-right key will be described with reference to FIGS. 13 and 14. The processing procedure is performed inside the receiving system 10.

The program A introduction XML document is input to a style management module together with an enabled style using-right key.

Inside the style management module, initially, each of the content ID and the style ID is fetched from the CONTENTS tag and the USESTYLE tag in the XML document (step S11). Furthermore, based on the fetched content ID, a style ID' is fetched from the style using-right key (step S12).

Then, in step S13, it is determined whether or not the style ID' fetched from the style using-right key matches the style ID specified in the XML document.

If the style IDs do not match and the authentication fails, instead of obtaining an authorized style sheet, a blank style sheet is created (step S14). As a result, the user of the receiving system 10 cannot enjoy the benefits of the broadcast station 1 program introduction style sheet which has added functionality and a great added value.

On the other hand, if the style IDs match and the authentication succeeds, based on this style ID, the receiving system 10 obtains a program introduction style sheet which is prestored in the HDD 29/62 (step S15). Then, this style sheet is returned to the style management module which is a request source (step S16).

Figure 15:
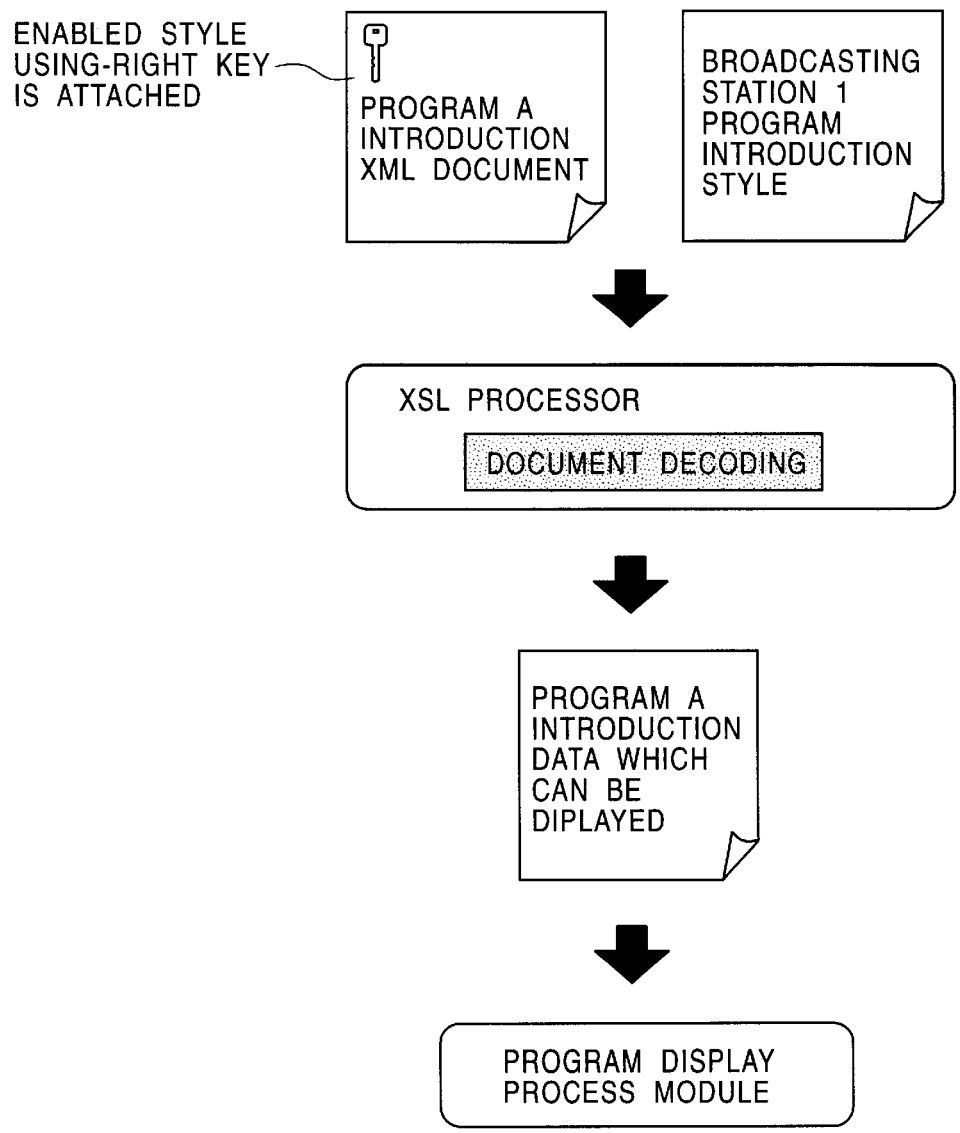
FIG. 15 schematically shows the procedure for document processing in an XSL processor.

The obtained style sheet is input to the XSL processor together with the program A introduction XML document, and a document conversion process is performed. FIG. 15 schematically shows the procedure for document processing in the XSL processor. A description will be given below with reference to FIG. 15.

The XSL processor performs document processing by merging an XML document body (for which syntax has already been analyzed by an XML parser) and a program A introduction style sheet so as to create program A introduction data in a display-enable form. The created program A introduction data is transferred to a program display process module.

If the style sheet specifies an HTML browser as an object of display, program A introduction data to be created becomes a document in an HTML format. Also, when an object of display is for a printer, a document to be created becomes data in a format which can be output by a specified printer.

Figure 16:
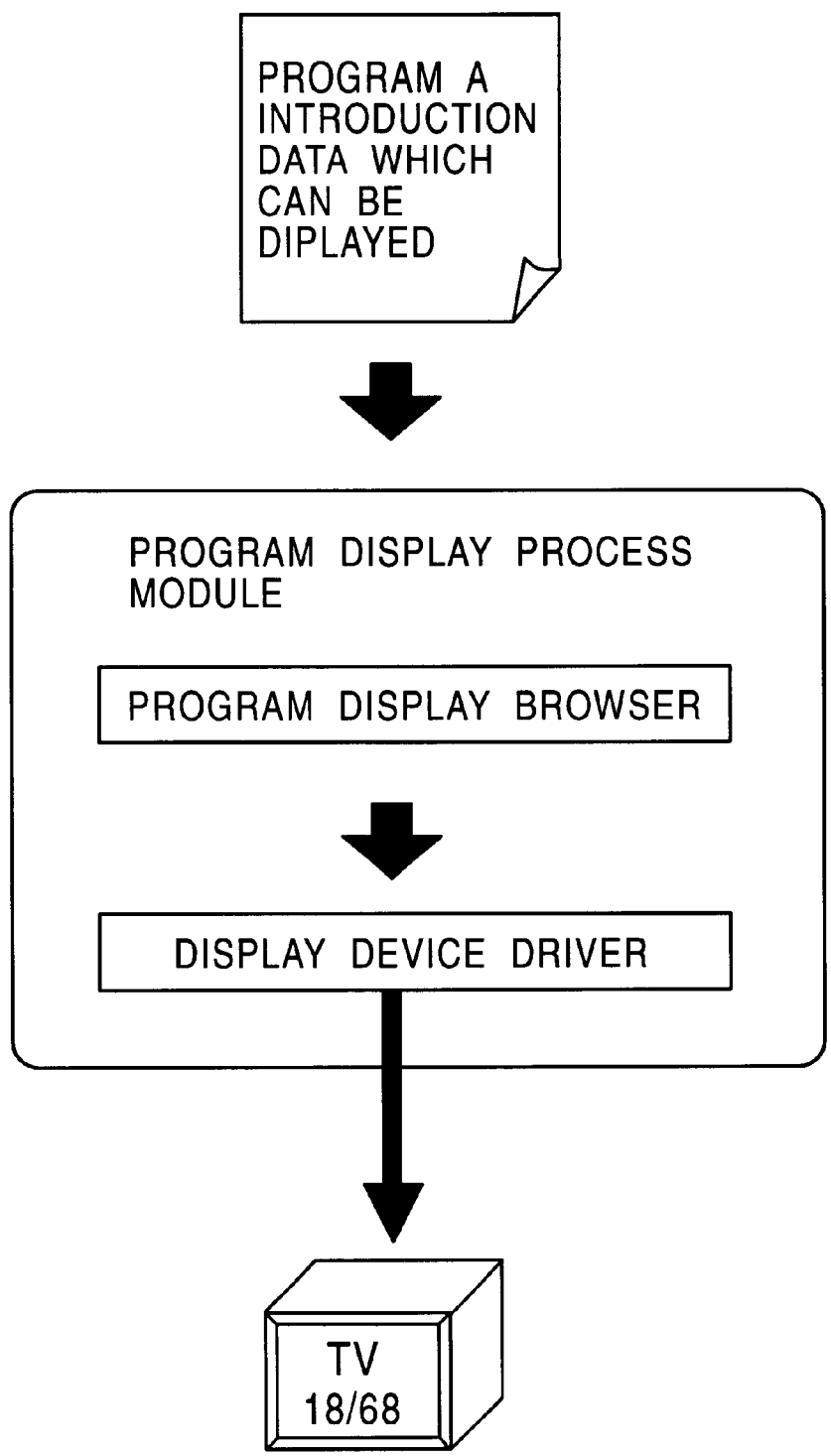
FIG. 16 schematically shows the procedure for display processing in a program display process module.

FIG. 16 schematically shows the procedure for a display process in the program display process module. A description will be given below with reference to FIG. 16.

The program A introduction data converted into a display-enable format is transferred to the program display process module.

In this embodiment, there is a browser for performing a program display, and the created data is processed specifically by this browser. That is, the browser processes program A introduction data in a display-enable format, and entrusts a switching process to a device driver for the audio-visual output section 18/68, such as a TV.

As a result of the display output process by the device driver, it is possible for the user of the receiving system 10 to see the introduction information of the program A via the screen.

In the case where a printer, rather than a TV, is specified as the object of display, the process is entrusted to a printer driver so that a printer command for print output is controlled.

As has thus been described in detail, according to the present invention, it is possible to provide a superior style sheet management technology which is capable of appropriately managing style sheets which define the expression form of a document in a computer language format. The computer language is described, for example, in a markup language (for example, XML (eXtensible Markup Language)) format in which tags which can be defined arbitrarily are used.

Also, according to the present invention, it is possible to provide a superior style sheet management technology which is capable of appropriately managing style sheets (for example, XSL (eXtensible Stylesheet Language) data) which define the expression form of an XML document.

Also, according to the present invention, it is possible to provide a superior style sheet protection technology which is capable of appropriately preventing use without permission of style sheets (for example, XSL (eXtensible Stylesheet Language) data) which define the expression form of an XML document.

According to the receiving system of the present invention, since style sheets can be stored and managed separately from XML documents as the digital data body to be distributed, it is possible to reuse the style sheets appropriately. As a result, it is not necessary to add a style sheet to each digital data body and transmit it, and the amount of data transmitted can be reduced. In particular, in a case where a fixed display, such as an electronic program guide (EPG) or an advertisement, is produced, since it is not necessary to transmit display data sequentially, this is advantageous in a case where only a narrow transmission bandwidth can be used. Also, when the style sheet comes to have added functionality and becomes larger, the effects on communication load reduction are considerable. It is also possible to realize an environment in which only the style sheet is reused.

According to the receiving system 10 of the present invention, it is possible to manage each style sheet by using an ID in an centralized manner. It is also possible to appropriately control the use of a style sheet by adding key data, that is, a style using-right key. That is, since protection from unauthorized use is possible, it is possible to manage style sheets as authored works. Furthermore, as a result of the provision of means for specifying or authenticating the other party, limited use of a style sheet, such as enablement by a purchase procedure, becomes possible.

In a state in which a style sheet is not used, since a using-right key thereof is encrypted, it is possible to prevent use without permission by a user who does not have a using right. Also, it is possible to safely store style sheets inside a receiving apparatus, such as a set top box (STB).

In the above-described embodiments, the point is mentioned of managing content IDs and style IDs by a predetermined organization in a centralized manner worldwide. In addition to such a method, it is also possible to perform encryption by using a unique ID created on the basis of the content itself or the style itself. In such a case, it is possible to completely prevent unauthorized use, such as by a decoding process which deceives by imitating the ID.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A data distribution method for distributing a distribution data content described by a computer language to a receiving apparatus, comprising the steps of:
   adding a content identifier, which is unique to the distribution data content in a computer language format, to the distribution data content;
   adding a style identifier, which is unique to a style sheet which defines an expression form of the distribution data content, to the distribution data content;
   producing a style using-right key on the basis of the content identifier and style identifier; and
   adding the style using-right key to the distribution data content;
   wherein the style using-right key is compared with the content identifier and style identifier at the receiving apparatus.

2. The data distribution method according to claim 1, wherein the style using-right key is validated when the distribution data content is purchased.

3. The data distribution method according to claim 1, wherein said adding step adds a plurality of style identifiers selectable at the receiving apparatus.

4. A data distribution apparatus for distributing a distribution data content described by a computer language to a receiving apparatus, comprising:
   content identifier adding means for adding a content identifier, which is unique to the distribution data content in a computer language format, to the distribution data content;
   style identifier adding means for adding a style identifier, which is unique to a style sheet which defines an expression form of the distribution data content, to the distribution data content;
   producing means for producing a style using-right key on the basis of the content identifier and style identifier; and
   style using-right key adding means for adding the style using-right key to the distribution data content;
   wherein the style using-right key is compared with the content identifier and style identifier at the receiving apparatus.

5. The data distribution apparatus according to claim 4, wherein the style using-right key is validated when the distribution data content is purchased.

6. The data distribution apparatus according to claim 4, wherein said style identifier adding means adds a plurality of style identifiers selectable at the receiving apparatus.

7. A data receiving method for receiving distribution data content described by a computer language from a distribution apparatus, comprising the steps of:
   receiving the distribution data content identified by a content identifier in a computer language format;
   receiving a style sheet identified by a style identifier, which defines an expression form of the distribution data content;
   producing a style using-right key on the basis of the content identifier and style identifier; and
   determining whether the style using-right key produced in the producing step was added to the received distribution data content from the distribution apparatus.

8. The data receiving method according to claim 7, wherein the style using-right key is validated when the distribution data content is purchased.

9. The data receiving method according to claim 7, further comprising a step of selecting a style sheet from a plurality of style identifiers added to the distribution data content.

10. A data receiving apparatus for receiving distribution data content described by a computer language from a distribution apparatus, comprising the steps of:
   receiving means for receiving the distribution data content identified by a content identifier in a computer language format;
   said receiving means further receiving a style sheet identified by a style identifier, which defines an expression form of the distribution data content;
   producing means for producing a style using-right key on the basis of the content identifier and style identifier; and
   determining means for determining whether the style using-right key produced by the producing means was added to the received distribution data content from the distribution apparatus.

11. The data receiving apparatus according to claim 10, wherein the style using-right key is validated when the distribution data content is purchased.

12. The data receiving apparatus according to claim 10, further comprising selecting means for selecting a style sheet from a plurality of style identifiers added to the distribution data content.

13. A data distribution method for distributing a distribution data content to a receiving apparatus in a markup language format in which tags that can be defined arbitrarily are used, comprising the steps of:
   adding a content identifier, which is unique to the distribution data content in the markup language format, to the distribution data content;
   adding a style identifier, which is unique to a style sheet which defines an expression form of the distribution data content, to the distribution data content;
   producing a style using-right key on the basis of the content identifier and style identifier; and
   adding the style using-right key to the distribution data content;
   wherein the style using-right key is compared with the content identifier and style identifier at the receiving apparatus.

14. The data distribution method according to claim 13, wherein the style using-right key is validated when the distribution data content is purchased.

15. The data distribution method according to claim 13, wherein said adding step adds a plurality of style identifiers selectable at the receiving apparatus.

16. A data distribution apparatus for distributing a distribution data content to a receiving apparatus in a markup language format in which tags that can be defined arbitrarily are used, comprising:
   content identifier adding means for adding a content identifier, which is unique to the distribution data content in the markup language format, to the distribution data content;
   style identifier adding means for adding a style identifier, which is unique to a style sheet which defines an expression form of the distribution data content, to the distribution data content;
   producing means for producing a style using-right key on the basis of the content identifier and style identifier; and
   style using-right key adding means for adding the style using-right key to the distribution data content;
   wherein the style using-right key is compared with the content identifier and style identifier at the receiving apparatus.

17. The data distribution apparatus according to claim 16, wherein the style using-right key is validated when the distribution data content is purchased.

18. The data distribution apparatus according to claim 16, wherein said style identifier adding means adds a plurality of style identifiers selectable at the receiving apparatus.

19. A data receiving method for receiving distribution data content described from a distribution apparatus in a markup language format in which tags that can be defined arbitrarily are used, comprising the steps of:
   receiving the distribution data content identified by a content identifier in the markup language format;
   receiving a style sheet identified by a style identifier, which defines an expression form of the distribution data content;
   producing a style using-right key on the basis of the content identifier and style identifier; and
   determining whether the style using-right key produced in the producing step was added to the received distribution data content from the distribution apparatus.

20. The data receiving method according to claim 19, wherein the style using-right key is validated when the distribution data content is purchased.

21. The data receiving method according to claim 19, further comprising a step of selecting a style sheet from a plurality of style identifiers added to the distribution data content.

22. A data receiving apparatus for receiving distribution data content described from a distribution apparatus in a markup language format in which tags that can be defined arbitrarily are used, comprising the steps of:
   receiving means for receiving the distribution data content identified by a content identifier in the markup language format;
   said receiving means further receiving a style sheet identified by a style identifier, which defines an expression form of the distribution data content;
   producing means for producing a style using-right key on the basis of the content identifier and style identifier; and
   determining means for determining whether the style using-right key produced by the producing means was added to the received distribution data content from the distribution apparatus.

23. The data receiving apparatus according to claim 22, wherein the style using-right key is validated when the distribution data content is purchased.

24. The data receiving apparatus according to claim 22, further comprising selecting means for selecting a style sheet from a plurality of style identifiers added to the distribution data content.

* * * * *